United States Patent
Stark et al.

(10) Patent No.: US 10,865,516 B2
(45) Date of Patent: Dec. 15, 2020

(54) WATERPROOF AND BREATHABLE, POROUS MEMBRANES

(71) Applicant: ETH Zurich, Zurich (CH)

(72) Inventors: Wendelin Jan Stark, Langenthal (CH); Mario Stucki, Zurich (CH)

(73) Assignee: ETH Zurich, Zurich (CH)

( * ) Notice: Subject to any disclaimer, the term of this patent is extended or adjusted under 35 U.S.C. 154(b) by 100 days.

(21) Appl. No.: 16/060,067

(22) PCT Filed: Dec. 6, 2016

(86) PCT No.: PCT/EP2016/079939
§ 371 (c)(1),
(2) Date: Jun. 7, 2018

(87) PCT Pub. No.: WO2017/097778
PCT Pub. Date: Jun. 15, 2017

(65) Prior Publication Data
US 2018/0371687 A1    Dec. 27, 2018

(30) Foreign Application Priority Data

Dec. 8, 2015 (EP) ................................ 15198440

(51) Int. Cl.
*D06N 3/00* (2006.01)
*B01D 67/00* (2006.01)
*C08J 9/26* (2006.01)

(52) U.S. Cl.
CPC ......... *D06N 3/0052* (2013.01); *B01D 67/003* (2013.01); *C08J 9/26* (2013.01);
(Continued)

(58) Field of Classification Search
CPC combination set(s) only.
See application file for complete search history.

(56) References Cited

U.S. PATENT DOCUMENTS

| 3,486,968 A | 12/1969 | Mater |
| 4,242,464 A | 12/1980 | Boutle |

(Continued)

FOREIGN PATENT DOCUMENTS

| CN | 104151585 A | 11/2014 |
| DE | 20 2007 019 212 U1 | 2/2011 |

(Continued)

OTHER PUBLICATIONS

International Search Report for corresponding International Application No. PCT/EP2016/079939 dated Feb. 7, 2017.

(Continued)

*Primary Examiner* — Taiwo Oladapo
(74) *Attorney, Agent, or Firm* — Renner, Otto, Boisselle & Sklar, LLP

(57) ABSTRACT

The invention relates to manufacturing processes for waterproof and breathable porous polymer membranes by coating a substrate with a dispersion comprising polymer, coated particles and diluent and removing the particles by dissolution, wherein the particles are made of organic salts, metal salts or metal oxides and the coating material is selected from carboxylic acids and alkoxy silanes. The invention further relates to dispersions to obtain such membranes, to polymer membranes obtained, to shaped articles containing such membranes; to the use of such membranes, shaped articles and intermediates.

9 Claims, 2 Drawing Sheets

(52) U.S. Cl.
CPC ..... *C08J 2375/08* (2013.01); *D06N 2209/123* (2013.01); *D06N 2209/128* (2013.01); *D06N 2211/10* (2013.01)

(56) References Cited

U.S. PATENT DOCUMENTS

| | | | |
|---|---|---|---|
| 2007/0036983 | A1 | 2/2007 | Takeda et al. |
| 2010/0155325 | A1 | 6/2010 | Zhang et al. |
| 2012/0077400 | A1* | 3/2012 | Flood ..................... B32B 5/245 442/76 |
| 2013/0171499 | A1 | 7/2013 | Yang et al. |
| 2013/0299417 | A1* | 11/2013 | Luchinger ............ B01D 67/003 210/500.27 |

FOREIGN PATENT DOCUMENTS

| | | |
|---|---|---|
| EP | 2 826 15 A1 | 1/2015 |
| EP | 2 826 815 A1 | 1/2015 |
| JP | 2004-256800 A | 9/2004 |
| JP | 2005-082756 A | 3/2005 |
| TW | 300908 B | 3/1997 |
| WO | 2002/034819 A1 | 5/2002 |
| WO | 2012/097967 A1 | 7/2012 |
| WO | 2014/170391 A1 | 10/2014 |
| WO | 2015/050784 A1 | 4/2015 |

OTHER PUBLICATIONS

Written Opinion of the International Searching Authority for corresponding International Application No. PCT/EP2016/079939 dated Feb. 7, 2017.
Database WPI Week 201012, Thomson Scientific, London, GB; AN 2010-B34507, XP002758615, & JP 2010 023017 A (Maruo Calcium KK) Feb. 4, 2010 (Feb. 4, 2010) abstract.
Database WPI Week 198344, Thomson Scientific, London, GB; AN 1983-804363 XP002758616, & JP S58 160326 A (Fujikura Rubber Works LTD) Sep. 22, 1983 (Sep. 22, 1983) abstract.

* cited by examiner

Ex. II.1.    Ex. II.2.    Ex. II.3.    Ex. II.4.    Ex. II.5.

WATERPROOF AND BREATHABLE, POROUS MEMBRANES

This application is a national phase of International Application No. PCT/EP2016/079939 filed Dec. 6, 2016, and claims priority to European Application No. 15198440.8 filed on Dec. 8, 2015, which are incorporated herein by reference.

The invention relates to manufacturing processes for waterproof and breathable polymer membranes; to intermediates suitable to obtain such membranes; to polymer membranes as defined herein; to textiles containing such membranes; to the use of such membranes, textiles and intermediates.

Membranes separate compartments. In clothing, rain and weather is kept outside while sweat should move through the membrane to the outside. Current porous membrane systems in clothing are predominantly based on fluorine chemistry (Gore-tex, event) to keep water outside even at high pressures (high water column (WC)) while still maintaining a high breathability (water vapor transmission rate (WVTR)). Fluorine containing hydrocarbons are extremely persistent and therewith considered a threat to nature. The present inventors thus identified a need for materials that can be disposed of after use by non-hazardous incineration. The present inventors identified a particular need for materials that can be used in partially or fully biodegradable clothing at the usual high protection performance.

Commercial alternatives to the fluorine-membrane consist of a solid layer of polymer, which provides superior water proofing, however, restricts the water vapor transport to solid state diffusion (Sympatex). The few porous alternatives are produced by phase inversion (Marmot NanoPro) or meltblending and dissolution (ProPore), two processes that are extremely limited in changing production conditions; for example multilayers are not possible. The present inventors thus identified a further need for improved manufacturing processes to obtain membranes and biodegradable clothing at the usual high protection performance.

Lüchinger et al (WO2012/097967) disclose nano-porous polymer membranes and its application as filter material. The method involves the use of un-coated nanoparticles, which are removed after film formation by a dissolution step. Due to its intended use as a filter material, these polymer membranes are not suitable for waterproof and breathable applications, such as clothing.

Hong et al (WO02/34819) disclose methods for the preparation of polymer membranes having waterproof and gas permeable properties. The method involves the use of un-coated CaCO3 microparticles, which are removed after film formation by a dissolution step. This dissolution steps takes a long time.

Zhang et al (US2010/0155325) disclose particle template membranes and related processes for their manufacturing. The method involves a template-based approach, which is difficult to control on large-scale manufacturing and also comparatively slow, making it expensive for large-scale manufacturing.

Boutle (U.S. Pat. No. 4,242,464) discloses a microporous polymer material made by coagulating a polymer solution containing dispersed microscopic particles of a removable filer soluble in a coagulating liquid. Manufacturing by coagulation is considered disadvantageous, particularly for versatile and adaptable large—scale production.

Consequently, there is a need for providing additional/improved manufacturing processes for polymer membranes; there is also a need for new polymer membranes having beneficial properties.

Thus, it is an object of this invention to mitigate at least some of these drawbacks of the prior art. In embodiments of the present invention improved manufacturing processes for porous polymer membranes are provided. In further embodiments of the invention polymer membranes which are suitable for advanced applications, such as in waterproof and breathable textile materials, are provided. In further embodiments of the invention new uses of materials are provided.

The present invention will be described in more detail below. It is understood that the various embodiments, preferences and ranges as provided/disclosed in this specification may be combined at will. Further, depending of the specific embodiment, selected definitions, embodiments or ranges may not apply. It is further understood that all references identified herein are incorporated by reference in its entirety.

The above objectives are achieved by providing a manufacturing process as defined in claim 1. Further aspects of the invention are disclosed in the specification and independent claims, preferred embodiments are disclosed in the specification and the dependent claims. The manufacturing process for waterproof and breathable polymer membranes, as described herein, proves to be very versatile, reliable, simple to control. The process is particularly suitable for fast and low-cost production of large area membranes. Polymer membranes as described herein prove to be useful in applications as defined below and further enable the manufacture of improved articles and/or facilitate manufacture of articles as defined below.

As it will become apparent when reading this specification, the invention relates in a first aspect to a method for manufacturing polymer membranes; in a second aspect to intermediates suitable for manufacturing such polymer membranes; in a third aspect to novel polymer membranes; in a forth aspect to textiles comprising (i.e. containing or consisting of) such polymer membranes; and in a fifth aspect to uses of such membranes, textiles and intermediates.

Further, the present invention will be better understood by reference to figures FIG. 1 shows a schematic view of the inventive process, wherein process steps are as defined herein; (1) represents the inventive porous membrane (unsupported; free-standing); (2) represents the inventive porous material, supported on a substrate and containing the coating material on the inner surface (6); (4) represents a nano-structured network of a polymer and coated particles (optionally dispersed in diluent), either unsupported ("free-standing") or supported on a substrate (6); (5) represents a dispersion comprising a dissolved polymer, diluent and coated particles, (7) represents coated particles.

FIG. 2 compares the inventive process (right) with previously known processes according to Lüchinger et al (left) and Hong (middle). In this figure, the following abbreviations are used: k=kneading, fp=film preparation, A=Additives, D=Dispersion, M=Porous Membrane, P=Polymer, uPT=un-coated Pore Template, cPT=coated Pore Template, S=Solvent, SC=Surface Coating. Steps marked with * are optional. The left-hand sided remarks a1, a2 and b correspond to the steps described below, first aspect of the invention.

FIG. 3 compares water column ([m], grey) and WVTR ([g/m2/d], black) for various samples as outlined in the examples; ex.1, 2, 3 for comparison, ex. 4 and 5 according to the invention.

Figure 1:
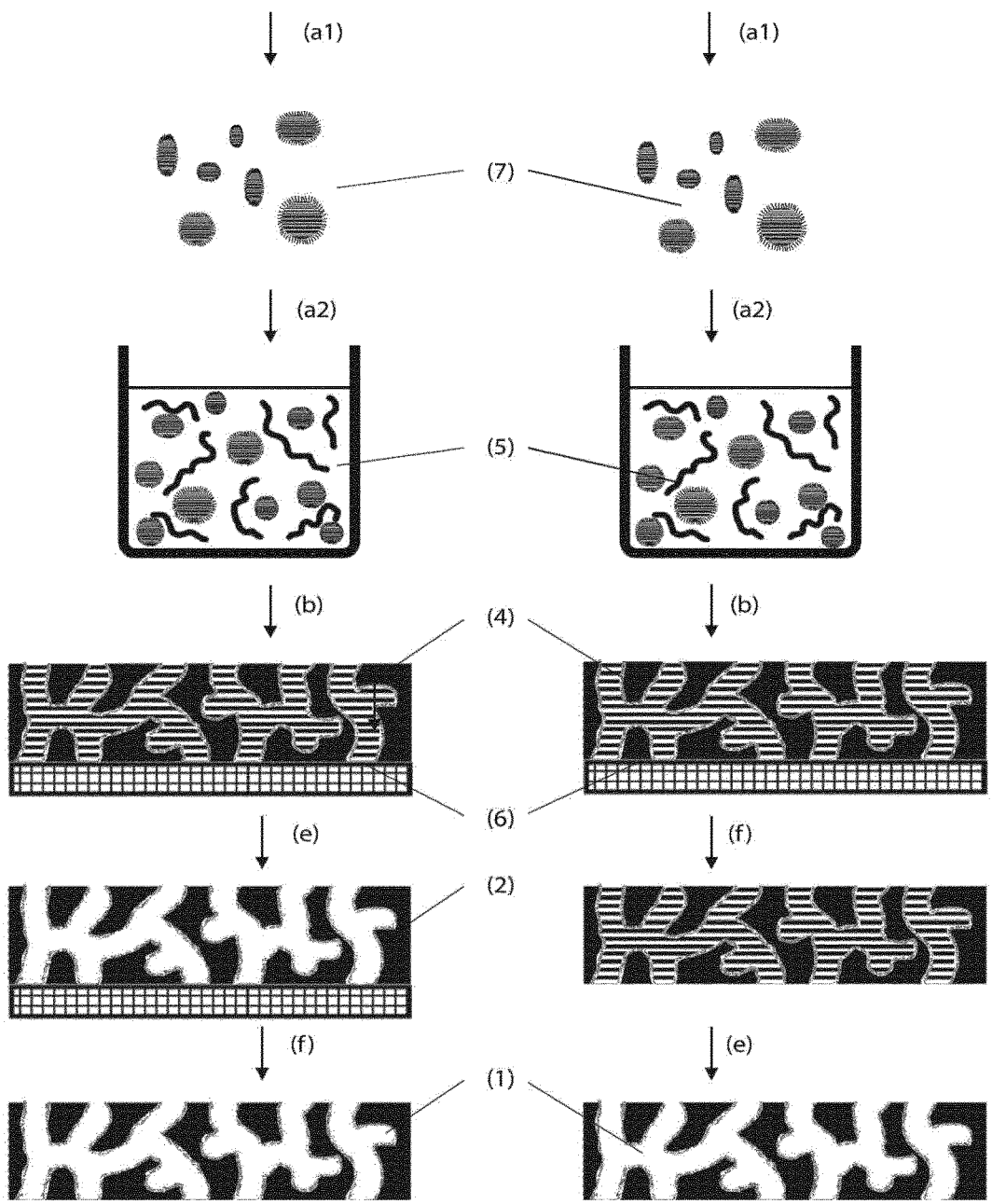
Figure 2:
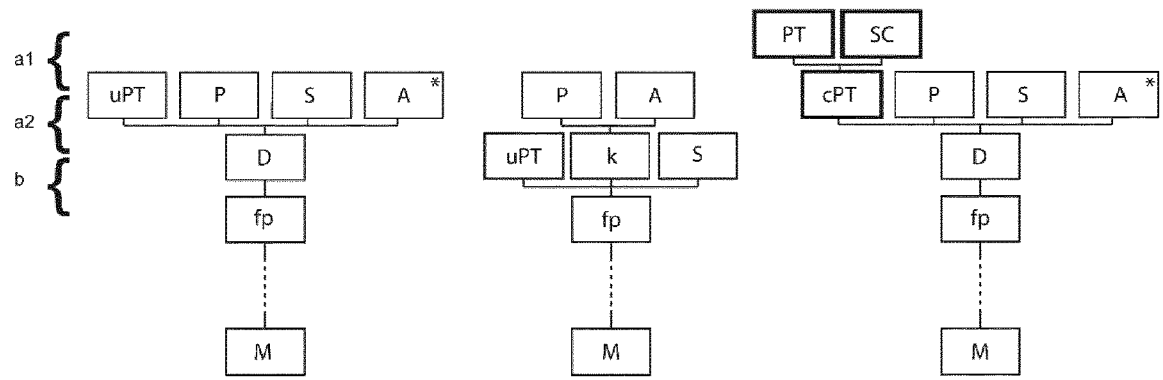

Unless otherwise stated, the following definitions shall apply in this specification:

The term "particle" is known in the field and includes crystalline or amorphous materials. It is known that particles may agglomerate. In the context of the present invention, suitable particles have a diameter in the submicron size range, whereby particle sizes are preferably between 5-10000 nm, such as 5-1000 nm. Suitable particles may be obtained from a range of preparation methods, including high temperature-gas phase processes (such as flame synthesis, laser processes and plasma processes), and liquid phase chemical methods (such as precipitation and sol-gel processes) and milling of particles. Particles particularly suitable in the context of the present invention may be obtained by a flame spray synthesis (FSP) process or milling of larger particles.

The term "salt" is known in the field. A salt is defined as the product formed from the neutralisation reaction of acids and bases. Salts are ionic compounds composed of cations and anions so that the product is electrically neutral. Examples of salt classes are halogenides (chlorides, fluorides, bromides, iodides), sulphates, phosphates, carbonates, nitrates, particularly phosphates, carbonates and halogenides. In inorganic salts, the cation is a metal ion and the anion is a non-metal ion; specific examples of inorganic salts include calciumphosphate, calciumcarbonate, magnesiumsulfate, sodiumchloride, ammonium chloride and ammonium carbonate. In the context of the present invention, metal oxides (i.e. a product formed by oxidation of a metal) are not considered salts. In organic salts, the cation or the anion is an organic ion; examples of organic salts may be selected from the group consisting of alkyl-ammonium salts, and metal carboxylates.

The term "polymer" is known in the field. The term refers to a material of repeating structural units ("monomers"), particularly to synthetic polymers (comprising synthetic monomers). The term thus includes homo-polymers, co-polymers and blends thereof. The term further includes oligomers. Polymers may be cross-linked.

The "porosity" of a material as described herein is the volumetric percentage of pores of the total material. Porosity can be determined by porosimetry, by measuring the apparent material density, BET analysis or by microscope images. A particularly suitable method in the context of this invention is the optical analysis of the membranes' surface thereby providing information on pore mouth size.

The "permeability" of a material as described herein is defined as the flux of a fluid (i.e. a liquid medium or a gaseous medium) through interconnected pores of the material. Permeability can be determined by measuring the liquid or gas volume which passes a defined membrane area in a defined time at an applied pressure.

For gaseous medium, the Water vapor transmission rate (WVTR) is a suitable parameter to determine permeability. WVTR is measured according to the ASTM Standard E96 B in gram per square meter and day (g/(m² d)). This method, also known as upright cup method, consisted of a cup with water that is covered by the test specimen. The so prepared sample was weighed before it was placed in an oven, which controlled temperature (23° C.), relative humidity (50% RH) and ventilation (1 m/s). Two phenomena contribute to the transport of vapor through a porous membrane; solid state diffusion (as a minor influence) and pore diffusion (the main mean of transport). In a non-porous (or dense, defect free) layer only solid state diffusion occurs.

Solid state diffusion can be described according to E.L. Cussler (Cussler, E. L. *Diffusion*. (Cambridge University Press, 1997, p. 21) with the following term:

$$j = -\frac{DH}{l}(c_{in} - c_{out})$$

With j in gram per square meter and day (g/(m² d)) describing the flux out of the covered cup, D the diffusion coefficient in square meter per second (m²/s) of the water molecules in the membrane material, H the partition coefficient (dimensionless) for the solubility of the water molecules in the membrane material and $c_{in}$ and $c_{out}$ being the concentrations of water molecules within the cup and outside in mol per cubic meter (mol/m³).

In porous media the water molecules are free to diffuse through the pores, this is described by a flux with a corrected diffusion coefficient:

$$j = -\frac{D_{eff}}{l}(c_{in} - c_{out})$$

$$D_{eff} = \varepsilon \frac{D}{\tau}$$

Where ε is the void fraction (dimensionless number between 0 and 1) of the porous membrane and τ stands for the tortuosity of the porous system (dimensionless number between 0 and 1).

For smaller pores diffusion, which is based on the interaction of the molecules with each other, gets limited because the water molecules not only interact with themselves but much more frequently with the pore walls. In air the free mean path is about 60 nm which means that pores with smaller diameter show Knudsen diffusion where the diffusion coefficient gets adjusted as follows[1]:

$$j = -\frac{D_{Kn}}{l}(c_{in} - c_{out})$$

$$D_{Kn} = \frac{d}{3}\left(\frac{2k_B T}{m}\right)^{\frac{1}{2}}$$

Where d is the pore diameter in meter (m), 9 the Boltzmann constant in joule per kelvin (J/K), T the temperature in kelvin (K) and m the mass of the particles in gram (g).

For liquid medium, the waterproofing is a relevant parameter. In determining water proofing, the relevant driving force is pressure. The water column (WC) in meter (m) is determined according to ISO 811. Water was pressed onto the sample at constant pressure increase (600 mmWC per minute) over time. The dry side of the sample is observed optically and the third penetrating water droplet is defined as the breakthrough of the sample and the pressure represented the water column (WC). Theoretical approximation can be done with the Hagen-Poiseuille equation:

$$\Delta p = \frac{32\, V\, \eta\, t}{A\, \varphi\, d^2}$$

With the pressure difference ($\Delta p$ in bar) calculated by V the volume flow in cubic meter per second ($m^3/s$), $\eta$ the viscosity in bar times second (bar s), t the layer thickness in meter (m), A the layer area in square meter ($m^2$), $\varphi$ the area porosity as a dimensionless number at values between 0 and 1 and the diameter of the pores (d) in meter (m) (Kellenberger et al. *J. Membr. Sci.* 387-388, 76-82 (2012).

The "specific surface area" of a material as described herein is the total air-particle interface area per amount of particle mass. This may be determined by nitrogen adsorption using the BET method (according to: Janssen et al, *Journal of Applied Polymer Science* 52, 1913, 1994). The BET method is widely used in surface science for the calculation of surface areas of solids by physical adsorption of gas molecules (e.g. Nitrogen molecules). The basic principle of the measurement is that a material with a high surface area can adsorb more molecular nitrogen on its surface (assuming a molecular monolayer).

In general terms, the present invention relates in a first aspect to a method of manufacturing a porous polymer membrane (1) comprising the steps of (a) providing a dispersion (5) containing (i) one or more diluents, (ii) one or more polymers dissolved therein, (iii) coated particles dispersed therein; (iv) optionally one or more additives dissolved therein; (b) coating a substrate (6) with said dispersion (5); (c) optionally subjecting the obtained material (4) to a drying step; (d) optionally subjecting the thus obtained material to a polymerisation or cross-linking step; (e) removing said one or more particles by a dissolution step; (f) optionally removing the obtained polymer membrane from said supporting material (6). This process is illustrated in FIG. 1, left hand side.

It is believed that the use of coated particles significantly influences the properties of the porous polymer membrane. Compared to non-coated particles, the waterproofing (measured as water column, WC) is significantly increased while the breathability (measured as water vapour transport properties, WVTR) is essentially maintained. These advanced properties of the obtained polymer membranes are unexpected and attributed to the specific coating materials of the particles. It is further surprising that the method described herein not only works with non-coated particles as described in literature, but also works with coated particles as described herein.

This aspect of the invention shall be explained in further detail below, whereby the process steps are described first and suitable materials are described afterwards:

The manufacturing processes as described herein are considered advantageous, as the individual steps a) to f) are known in industry and already in commercial use. Further, the process described is very fast and may be implemented in a continuous process.

Step a: A dispersion (5) containing a mixture of coated particles, diluent(s), polymer(s) and optionally additives is provided first.

This step may be divided in to sub-steps, namely preparing coated particles (7) (step (a1)) and preparing a dispersion (5) (step (a2)). These individual steps (a1) and (a2) are known per se but not yet applied in to the specific starting materials described herein.

step (a1): Suitable manufacturing methods for coated particles (7) are known per se, and include ball milling of the respective starting materials (uncoated particles and coating materials), optionally in the presence of an inert diluent.

step (a2): Suitable manufacturing methods for dispersions (5) are known per se, and include preparing a solution of diluent, solvent, optionally additives and combining this solution with the coated particles of step (a1).

Typically, the amount of diluent in dispersion (5) is at least 40 wt. %, preferably at least 60 wt. %, such as 65 wt. % of the dispersion. Such comparatively high amount of diluent ensures low viscosity and thereby thin film formation during the coating step.

Typically, the ratio of polymer:coated particles (wt %) is in the range of 2:1 to 0.01:1, preferably 1:1 to 0.1:1, most preferably 0.75:1 to 0.2:1. Such comparatively high amount of coated particles ensures proper pore formation within the manufactured membranes (1). Without being bound to theory, it is believed that a lower amount will not provide interconnecting necks, while a higher amount will cause the coating to collapse.

It was surprisingly found that the inventive process provides very good results without the addition of additives (particularly without the addition of non-surface-bound surfactants) to the dispersion (5). Thus, in an advantageous embodiment, no additives (particularly no non-surface-bound surfactants) are added to dispersion (5). In one embodiment, dispersion (5) consists of coated particles, diluent(s) and polymer(s). In one further embodiment, dispersion (5) consists of coated particles, diluent(s), polymer(s), and surface-bound surfactant(s).

Step b: The dispersion of step (a) is applied to a substrate (6), e.g. by using conventional printing or coating methods. This results in a coated particle/polymer film (4) on said substrate (6) further containing diluent. Suitable methods are known in the field and include spraying, painting, roll-to-roll processes, dip-coating.

Step c: Afterwards, e.g. for faster solvent evaporation, the film (4) may be subjected to a heat treatment (e.g. drying) to obtain a polymer film containing coated particles. The temperatures and treatment times may vary, depending on the starting materials (particularly the diluent) and are typically below 200° C. and preferably below the melting point of the polymer.

Step d: The coated material of step (b) may be subjected to a polymerisation and/or cross-linking step. This step is optional and may be applied when appropriate starting materials are used. Particularly in case the polymer comprises oligomers and/or monomers that may be polymerised, optionally in the presences of an initiator (polymerisation); or in case the polymer comprises groups that may be crosslinked, optionally in the presence of a cross-linking agent (crosslinking step). Step (d) and step (c) may take place simultaneously or in subsequent steps.

Step e: The continuous salt phase/oxide phase in such nanocomposite membranes is dissolved which results in a nano-porous polymer film (the porous polymer membrane) on a substrate. Without being bound to theory, it is believed that the coating material remains within the polymer structure and is located on the surface of the interconnecting channels. This is depicted in FIG. 1 schematically. Suitable are particularly aqueous solvents, such as water or acidic aqueous solutions (e.g. acetic acid or hydrochloric acid). The choice of solvent particularly depends on the type of template material (metal salt/metal oxide) used.

The solvent in step (e) is selected to ensure dissolution of the coated particles without dissolving the polymer. It is surprising that not only non-coated particles, but also the coated particles as discussed herein can be readily dissolved in aqueous solution as described above. The dissolution step is fast, typical reaction times are in the range of 1 to 90 minutes, preferably less than 20 minutes.

It is believed that the dissolution step (e) is a key element of the manufacturing process and also a key element to obtain the inventive porous polymer membranes.

Step f: The substrate may be easily removed from the porous material, e.g. by peeling off (to obtain (1)) or by transfer to another substrate (to obtain (1) as a multilayer material or as a textile materials as discussed below). This removal step may take place after the washing step (e)(as outlined above) or prior to the washing step (e)(as outlined below). Step (f) may be performed using processes known per se. The removal step (f), aims to remove substrate (6) to obtain an unsupported porous material (1) or to transfer the porous material to another supporting material.

In an alternative embodiment the invention provides a method as described herein, wherein said step (f) is performed prior to step (e), as illustrated in FIG. 1, right hand side.

Consequently, the invention also relates to a method of manufacturing a polymer membrane (1) comprising the steps of (a) providing a dispersion (5) as described herein; (b) coating a substrate (6) with said dispersion; (c) optionally subjecting the obtained material (4) to a drying step; (d) optionally subjecting the thus obtained material to a polymerisation or cross-linking step; (f) removing the obtained material (4) from said supporting material (6); (e) removing said one or more coated particles by a dissolution step to thereby obtain the polymer membrane (1).

Suitable diluents may be selected from a broad range of known solvents and combinations thereof. Preferred are organic solvents with a b.p. below 200° C. Examples include organic solvents selected from the group consisting of alcohols, ethers, ketones, esters, halogenalkanes, alkanes, cycloalkanes, sulfoxides, amides, pyrrolidones, lactames.

Suitable polymers may be selected from a broad range of known polymers and combinations thereof and also includes polymers that may be cross-linked, oligomers that may be polymerized. The invention also includes the use of co-polymers, such as rubbers, and mixtures of polymers ("blends").

In one embodiment, the polymers are selected from the group of soluble polymers. In the context of the present invention, a polymer is considered a soluble polymer in case 1 g of polymer dissolves in one litre of organic solvent or one litre of water and where the thus obtained solution follows the standard behaviour of polymer solutions (such as viscosity as a function of concentration and temperature; change in the solvent's vapour pressure, transparency of the solution). Typically, such soluble polymers show little or no cross-linking. Such polymers are known to the skilled person and may be readily identified. Soluble polymers may be selected from the group consisting of polyurethanes, ethyl-vinylacetates, polycarbonates, artificial rubbers, polyesters, polyether, polyaryletherketones, polyamides, polyacrylater, polyarylates, polystyrenes, cyclo-olefin-copolymers and polyolefins.

In one further embodiment, the polymers are selected from the group of pre-polymers, which are cross-linked in a subsequent step. Cross-linked polymers are typically not soluble, while the corresponding starting materials are. Again, such polymers are known to the skilled person and may be readily identified. Cross-linked polymers may be selected from the group consisting of natural and artificial rubbers, polysiloxanes, epoxide resins and specially modified, cross linkable forms of the polymers mentioned above.

In a further embodiment, the polymers are selected from the group of pre-polymers, which are polymerized in a subsequent step. Such polymers may or may not be soluble, depending on the molecular structure. Suitable pre-polymers that are polymerized may be selected from the group of polyesters and polyamides where the corresponding starting materials are lactones and lactames respectively and from polyurethanes, where diisocyanates and dioles or/and amines are the respective starting materials.

Particularly preferred polymers according to this invention are selected from the group of polysulfones, polyethersulfones, polycarbonates, polystyrenes, polyacrylates, polysiloxanes, polyarylates, polyurethanes, ethyl-vinylacetates, artificial and natural rubbers, polyesters, polyether, polyaryletherketones, polyamides, cyclo-olefin-copolymers and polyolefins.

Figure 4:
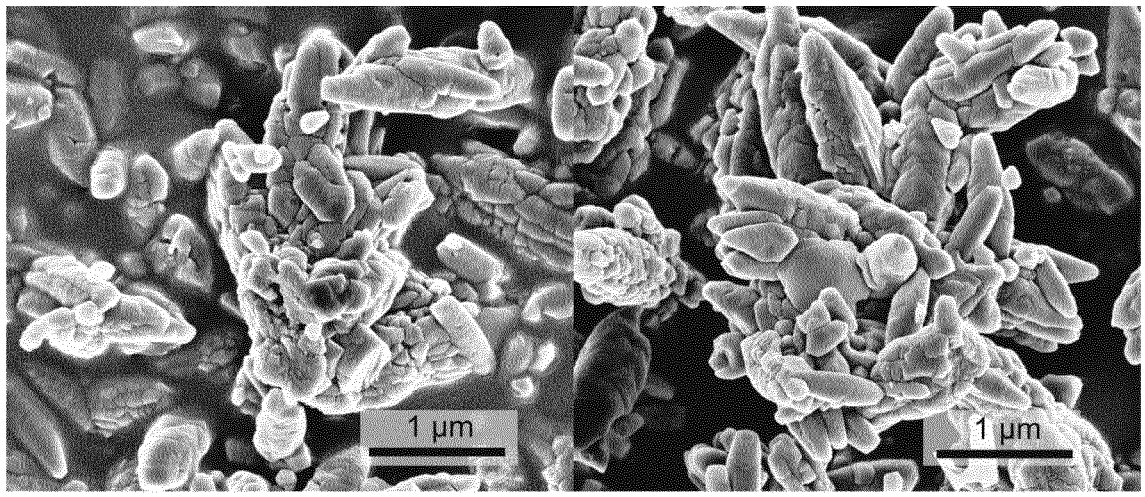
FIG. 4 shows micrographs of uncoated particles (left, for comparison) and coated particles (right, according to the invention example 7) as prepared according to the examples. As can be seen, the morphology and particle size is not affected by the coating.

Suitable coated particles may have a particle size of 5-10000 nm, preferably 5-1000 nm, very preferably 50-400 nm. Exemplary coated particles and are shown in FIG. 4. Suitable materials for said particles may be selected from a broad range of known template materials, including inorganic pore templates selected from the group of metal salts, and metal oxides, as well as organic pore templates selected from the group of organic salts, and combinations thereof. Preferably, the metal salt particles are selected from the group consisting of Carbonates (including Hydrogencarbonates), Sulphates, Halogenides, Nitrates and Phosphates, preferably Carbonates. Examples of metal salts include $MgCO_3$, $CaCO_3$, $SrCO_3$, $BaCO_3$, $Na_2CO_3$, $K_2CO_3$, NaCl. Examples of metal oxides include ZnO and MgO. Preferably, the organic salt particles are selected from the group consisting of solid alkyl-ammonium compounds and alkali-metal carboxylates. Examples of organic salts include tetramethylammonium chloride and sodium citrate. The pore templates may be obtained from known synthetic process, such as a wet process or a dry process, or may be obtained from naturally occurring sources.

Suitable coating materials for said particles may be selected from surface functionalizing reagents known to the skilled person.

Suitable coating materials for said particles may be selected from carboxylic acids, such as $C_{6-34}$ carboxylic acids, and mixtures of carboxylic acids. In the context of this invention, carboxylic acids may be linear or branched. Further, carbocyclic acids may contain one or more double bonds. The term carboxylic acid further includes mono-carboxylic acids and di-carboxylic acids. Suitable carboxylic acids are selected from the group of naturally occurring fatty acids, such as stearic acid, and naturally occurring dicarboxylic acids, such as pimelic acid sebacic acid.

Suitable coating materials for said particles may further be selected from the group of alkyl-aryl-alkoxy-silanes, arylalkoxy-silanes, alkyl-alkoxy-silanes, and mixtures of such silanes. In the context of this invention, these silanes may be selected from the group of trialkoxy-silane derivatives, dialkoxy-silane derivatives and monoalkoxy-silane derivatives. Further, these silane derivatives may be cyclic or linear and thus include corresponding oligomers. Suitable silanes are selected from the group of $((C_{2-16})alkyl)Si(OMe)_3$, $((C_{2-16}alkyl)Si(OEt)_3$, $((C_{2-16})alkyl)_2$-$Si(OMe)_2$, ((C$_{2-16}$)alkyl)$_2$Si(OEt)$_2$ and corresponding, optionally substituted phenyl group containing derivatives, such as (C$_{2-16}$)alkyl)Ph-Si(OMe)$_2$. For aryl-silanes, one or more of the above alkyl group is replaced by at least one phenyl or substituted phenyl group.

Preferably, the coated particles are prepared prior to step (a2) in a separate process (a1) as outlined above. The invention thus relates to a method as described herein, wherein the particles are not prepared in situ, i.e. pre-manufactured.

The coated particles show no evidence of apparent change in morphology compared to uncoated particles, as shown in FIG. 4. The particles' inside comprises the material of the particle as discussed above. Part of the particle, close to the surface, has reacted with coating material, to form chemical bonds and/or to adsorb the coating material. The coating with high carbo-content organic molecules is evidenced by the elemental analysis shown in the experimental part. Here the presence of a coating results in a significant increase in carbon and hydrogen content of the sample. This allows a facile detection of such coatings using CHN microanalysis, a standard method in organic chemistry. Suitable instruments are available from the company elementar (Germany) or LECO instruments (USA).

Suitable additives may be selected from a broad range of known additives and mixtures thereof and are known in the field. The term additives includes film flow-, film uniformity-, anti-orange peel- and wetting-agents. Such additines are commercially available, e.g. from Byk Additives and Instruments, Evonik Industries, CRODA International.

Suitable substrates may be selected from a broad range of known substrates. The substrate may be any support compatible with the manufacturing process; particularly, it needs to be inert towards the solvents used. It is further beneficial, if the coating adheres to the substrate during manufacturing and can be removed after manufacturing. Suitable materials for a substrate include polymer materials, glasses, metals (such as aluminium), ceramics and paper (in each case coated or uncoated).

In the case of textile manufacturing it can be advantageous to directly coat the here described dispersions onto a tightly woven fabric. In this embodiment, it is advantageous if the membrane polymer adheres well to the type of polymer or biopolymer used in the textile substrate. For outdoor clothing, suitable substrate are tightly woven polyamide or polyesters. Suitable textiles are available under the brand name ripstop nylon.

Suitable dispersions may be prepared from the above starting materials using known techniques. Preferred dispersions contain 40-99 wt.-% diluents and/or 1-20 wt.-% polymers and/or 0.5-40 wt.-% coated particles and/or 0-5 wt.-% additives as defined herein. It was found suitable to combine the starting materials by vigorously stirring the components and/or subjecting the components to ultrasonic treatment and/or subjecting the mixture to a ball milling step. In one embodiment, the dispersion may be kept at elevated temperature, e.g. 40-100° C. Such temperatures increase polymer solubility, reduce viscosity and facilitate the method described herein.

Preferably, the coated particles are selected from the group consisting of Carbonates (including HCO$_3^-$), the coating material is selected from the group of naturally occurring long chain fatty acids and the process is a continuous process (as described below). It was surprisingly found that a continuous manufacturing process of porous membranes may be realized when using such coated particles as the starting material. This may be attributed to the particularly fast dissolution and complete removal of carbonates in aqueous (or acidic) solutions.

In a further embodiment, inventive method provides a process for manufacturing polymer membranes (1) without using a phase separation process/phase separation step. Such phase separation (e.g. as described in Boutle as coagulation (50)) is limited to specific polymers and the corresponding pore formation is highly sensitive to various process parameters (e.g. temperature, humidity, time) which need to be carefully controlled simultaneously. It is apparent that such process is disadvantageous for fast and large-scale commercial manufacturing. Thus, the invention also provides a method as described herein, which does not involve a phase separation step. In the context of this invention, a phase separation step is considered a separate step in a manufacturing process that requires specific equipment. It is also noted that phase inversion is only observed for a limited number of polymers/combination of polymers. The present invention is not limited to such specific polymers or combinations thereof and thus considered much more versatile.

In a further embodiment, inventive method provides a process for manufacturing polymer membranes (1) without using a stretching process/stretching step. Such stretching is limited to specific polymers and typically applied to a foil to obtain a membrane. Such additional step is difficult to control and thus disadvantageous for commercial manufacturing. Thus, the invention also provides a method as described herein, which does not involve a stretching step.

In a further embodiment, the invention provides a method of manufacturing a polymer membrane (1) as described herein comprising the step of subjecting a shaped article (containing substrate (6) and coating) to a dissolution step (e) and removing from the thus obtained shaped article said support (step f). The dissolution step (e), as outlined above, aims to remove all or essentially all template material from said article. The removal step (f), as outlined above, aims to remove substrate (6) to obtain an unsupported porous membrane (1) or to transfer the porous membrane to another supporting material, e.g. to obtain a coated textile.

In a further embodiment, the invention provides a method of manufacturing a polymer membrane (1) as described herein, consisting of the steps (a) providing a dispersion (5) as described herein; (b) coating a substrate (6) with said dispersion; (c) subjecting the obtained material (4) to a drying step (to remove the diluent); (e) subjecting the obtained material to a dissolution step (to remove the one or more coated particles); (f) removing the obtained polymer membrane from said supporting material (6) (to obtain the porous polymer membrane (1)).

In a further embodiment the process step (e), may be repeated. This measure ensures a complete removal of coated particles. Thus, step (e) also includes multiple washings and dryings. When using a multi-step protocol, either the same or different solvents may be used, for example a diluted aqueous acid first, followed by water.

In a further embodiment, the invention provides a method as described herein, wherein one or more, preferably all steps a) to f) are adapted to a continuous process, such as a Roll-To-Roll-process (R2R process). In this embodiment, a multilayer material may be obtained, comprising the inventive porous membrane as one of said layers. Such multilayer material may have a thickness of 1 mm, or even more. Such multilayer materials can naturally take a more complex function than single layer materials. This can be advantageous in many applications, both textile and in buildings.

The manufacturing process described provides porous materials in virtually unlimited size. As the manufacturing steps a) to e) do not provide a limitation regarding the size of the material (except for the equipment used) large sheet materials, in terms of length and width, are obtainable. Thus, the invention also provides a process as disclosed herein, wherein the polymer membrane has an area of more than 100 cm², preferably more than 1000 cm², most preferably more than 1 m². When using roll-to-roll coating, polymer membranes with 100 m², or even more, can be prepared in a single piece.

By suitable selection of coated particles (such as size, coating material and amounts) and by the selection of process parameters (such as coating thickness, drying time) porosity and pore size distribution may be varied over a broad range. Thus, the invention also provides a process as disclosed herein, wherein the polymer membrane (1)
- has a porosity of 10-90%, preferably above 50% such as 55-60%; and/or
- has a Poremouth size of 5-2000 nm in Diameter (of which typically 95% n/n are smaller than 600 nm in diameter), preferably 50-500 nm (of which typically 95% n/n are smaller than 400 nm in diameter), most preferably 200-400 nm (of which 95% n/n are smaller than 300 nm in diameter); and/or
- has a water column (WC) of at least 4.8 m, preferably at least 9 m, particularly preferably at least 18 m; and/or
- has a water vapour transmission rate (WVTR) of at least 500 g/m2 per day, preferably at least 700 g/m2 per day; and/or
- has a water contact angle of at least 50°, preferably 95°. (This shows the hydrophobicity of the polymer membrane (1).)

As can be seen, the inventive process allows for manufacturing of membranes having a very high porosity. Such high porosity is advantageous for a high water vapour transfer rate and can also provide significant thermal insulation. Later is of obvious advantage in textile applications, in buildings and when used in multilayers.

The membranes (1) obtained according to the inventive process show good material properties, allowing manufacturing on commercial equipment. Typical data include max. stress and shore hardness as follows:

Stress: Around 3-5 MPa for the porous samples measured so about 7-10 MPa if the porosity is included. Max. Strain around 100% at fracture.

Shore Hardness: 80C/30D on the shore hardness scale for a nonporous block of used polymer. Note that the Shore hardness can only be measured on large samples, hence only material properties are noted, measured for a here used polymer but not for the finished membrane.

The membranes (1) obtained according to the inventive process show a thickness varying over a broad range and depend on its intended application. Suitable values are 30-60 µm for single layer membranes and up to 180 µm for triple layer membranes. For selected applications, also very thin or very thick membranes may be manufactured, such as from 0.01 µm to 1000 µm. For such extreme ranges, performance does not stay the same for WC and WVTR. Thick membranes (several hundred micrometer or more) are particularly suited for applications in the form of multilayers.

The present invention relates in a second aspect to intermediates or starting materials which are useful in a manufacturing process as described herein. This aspect of the invention shall be explained in further detail below:

In one embodiment, the invention relates to a dispersion (5) comprising (i.e. containing or consisting of) 40-99 wt % diluent; 1-20 wt % polymer; 0.5-40 wt % coated particles; and 0-5 wt % of additives. Such dispersions are suitable starting materials for the inventive process as described below. The individual components of the inventive dispersions are known per se or available according to known methods, suitable components are identified above, in the context of the "first aspect".

Particularly suitable components are identified below:

Diluent: Any liquid carrier suitable for dispersing the coated particles and dissolving the polymer may be used; preferred are the diluents identified above. The amount of diluent may vary over a broad range, depending on the intended following manufacturing step (such as spraying, coating or printing).

Polymers: Suitable polymers include polymers that are soluble in the diluent identified above, such as soluble polymers as described herein, polymers that may be cross-linked, oligomers that may be polymerized.

Coated particles: In a broad sense, any coated metal salt or metal oxide particles may be used in the inventive dispersion, preferred classes of particles and coating materials are disclosed above, first aspect of the invention. The manufacture of suitable coated particles is known in the field.

It was found advantageous to use pre-manufactured coated particles, while in situ formation of coated particles is less preferred.

Additives: Additives may be selected from the group consisting of surfactants, polymerisation initiators, stabilizers, cross-linking agents, wetting agents.

In certain embodiments, it was found the dispersion (5) has a shelf life of less than one day; particularly, as the particles separate from the diluent. The dispersions are nevertheless suitable for the inventive process but may be pre-treated prior to use (e.g. by sonication or milling). The invention thus relates to both, a dispersion as defined herein and a kit of parts, wherein a first part comprises (i.e. contains or consists of) coated particles as described herein and said second part comprises (i.e. contains or consists of) diluent, polymer and additives as described herein.

Such kit of parts may be traded for use in textile finishing as a taping seal, to coat sewed areas in textile manufacturing. After finishing the sewing steps, the textile semi-finished good is immersed in the here described dilute acid bath to dissolve the coated particles.

In a further embodiment, the invention relates to a material (4) comprising a substrate (6) and a coating, wherein said coating (i) contains coated particles, polymer(s), diluent(s) and optionally additive(s), each as defined herein; (ii) said particles are randomly distributed within said coating; and (iii) said coating has a thickness (d) between 0.01-1000 µm. The material (4) may be obtained by coating/printing a suspension (5) on a substrate (6), optionally followed by removing the above mentioned dispersing medium.

In case the final product is a supported material (2) the thickness is 0.01-1000 µm, preferably between 0.1-500 µm and most preferably between 30-60 µm.

In case the final product is a non-supported material (1), the thickness is 0.1-1000 µm, preferably between 1-500 µm most preferably between 30-60 µm.

The present invention relates in a third aspect to novel polymer membranes (1). This aspect, particularly advantageous polymers and characteristics of the inventive membranes, are outlined below.

Membrane: In one embodiment, the invention relates to a polymer membrane, said membrane has (i) a thickness and/or (ii) a porosity; and/or (iii) a pore size; and/or (iv) tensile properties and/or (iv) a water column; and/or a (v) water vapour transmission rate; and/or (vi) a water contact angle as described above, first aspect of the invention. Due to the unique manufacturing process, as outlined herein, the present invention provides porous membranes (or even nanoporous membranes) combining specific properties for organic polymers. It is considered advantageous that the above parameters may be adjusted due to the specific application of the inventive membrane.

In one embodiment, the inventive membrane may consist of one single layer. This embodiment is advantageous for jackets and outdoor clothing, house wraps in construction (to manage water and steam in buildings), packaging materials (e.g. for food, consumer goods and pharmaceuticals), and sensors. In one further embodiment, the inventive membrane may consist of two or more layers, such as 2 or 3 layers. This embodiment is advantageous for outdoor clothing (thereby providing enhanced comfort due to better sweat management, particularly by transporting sweat inside the jacket layer from ill-accessible to more accessible area of the clothing), cooling textiles (i.e. materials that provide a cooling effect to the user through evaporation of water from the multilayer material), packaging of living organisms, packaging of food, pharmaceuticals and sensitive consumer goods, cooling curtains (allowing passive cooling in and around buildings and public transport), humidification of air in air acclimatization units. Further applications are in flexible gas absorbers, air cleaning devices, personal hygiene and personal protection equipment.

Polymers: As outlined above, a wide variety of polymers may be used for the inventive membranes. In one embodiment, the polymer is selected from the group consisting of polymers soluble in organic solvents and cross-linked polymers thereof. This is considered advantageous, as the presently known polymer membranes are limited in view of the materials suitable and/or the characteristics of its pores. Suitable polymers may be selected from the group of polymers soluble in organic solvents and include polyurethanes, ethyl-vinylacetates, polycarbonates, artificial rubbers, polyesters, polyether, polyaryletherketones, polyamides, polyacrylates, polyarylates, polystyrenes, cycloolefin-copolymers, polyolefins and crosslinkable polymers such as natural and artificial rubbers, polysiloxanes and epoxide resins.

Advantageously, such polymers are free of halogens, particularly free of fluorine. This is considered advantageous, as the membranes are environmentally benign.

Advantageously, such polymers are free from silicone. This is considered advantageous, as the membranes are environmentally benign and desired in certain industrial applications. Advantageously soft polymers are the basis for membranes that provide the haptic, optical and mechanical properties needed for membranes to be used in clothing. It is also possible to increase the number of layers even with different types of polymers to combine the properties of each layer.

Pores: As outlined above, the inventive material is porous. The inventive material is characterized by the size, type and amount of pores present. The size and type and amount of pores may be influenced by the type of coating, the amount of coating material, starting materials, the ratio coated particles:polymer, the manufacturing process, the type of coating material.

Size: The size of the pores of the inventive membranes (defined by the diameter of the coated particles) is in the nanoscale range, typically between 5-2000 nm, preferably 50-500 nm and most preferably 200-400 nm. The size of the pores may be determined by microscopy. Further, the pore size distribution may be precisely adjusted, due to the starting materials used.

Amount: The porosity, i.e. the volume of pores in relation to the volume of the membrane in total, may be varied in a broad range. Inventive materials show porosity in the range of 10-90 vol-%, preferably 20-90 vol-%, much preferred above 50 vol-%, such as 55-60 vol-%. The porosity may be determined by micrograph analysis.

Type: The pores of the material may be arranged in a way that the material is permeable, partly permeable or impermeable. If essentially all pores of the material have dead ends, the material is impermeable. In the contrary, if essentially all pores of the material have open ends, the material is considered permeable. Consequently, if a fraction of the pores has dead ends, the material is considered partly permeable. In an advantageous embodiment, the present invention provides polymer membranes, wherein at least 50 preferably at least 80% of said pores are interconnected.

Thickness: The thickness of the inventive membranes may be varied over a broad range, such as from 0.01-1000 μm. In case the inventive membrane is present in the form of a monolayer, a suitable thickness is in the range of 0.01-1000 μm; preferably 1-500 μm most preferably 30-60 μm. In case the inventive membrane is present in the form of a multi-layer structure, a suitable thickness is in the range of 1-1000 μm; preferably 30-250 μm. Such membranes may also be termed "sheet material" or "porous foils"; these terms indicate that the material has a length and width which is at least one magnitude larger (preferably at least two magnitudes larger) than the thickness of the material.

Waterproofing (measured as WC) and breathability (measured as WVTR) of the inventive membranes is discussed above, first aspect of the invention.

Mechanical properties of the inventive membranes, like tensile strength, flexibility are suitable for many applications, such as in textile applications.

It was found that the membranes manufactured by the use of coated particles (i.e. according to the invention) and membranes manufactured by the use of un-coated particles have essentially the same types of pores (size, amount, type) and therefore essentially the same physical characteristics (tensile strength, hardness). Surprisingly, permeability (determined by WC and WVTR) significantly differ. Without being bound to theory, this is attributed to a coating of the pores with coating material during the manufacturing process as outlined herein.

The possible production of silicon free membranes are further of considerable interest in OEM manufacturing lines, as silicon is considered a risk in all industries that rely on painting and gluing and where a final coating is applied on the goods (e.g. automotive body paint shop; silicone causes defects in the outer paint finish).

In a further embodiment, the invention relates to a polymer membrane, particularly as described herein, obtainable by or obtained by a process as described herein.

The present invention relates in a forth aspect to textiles comprising a polymer membrane as described herein. A wide variety of articles may be equipped with the inventive porous material. This aspect of the invention shall be explained in further detail below:

In a further embodiment, the invention relates to a woven or non-woven textile material comprising a polymer membrane as described above, third aspect wherein said membrane is laminated on said textile, or said membrane is self-supporting and connected with said textile membrane by gluing, welding or sewing. It is considered beneficial that the inventive membranes may be readily applied to existing manufacturing equipment, as used in textile industry.

Accordingly, the invention further provides for a textile product, particularly selected from the group of clothing (such as coats, jackets, trousers, underwear) and containers (such as bags, backpacks) comprising a woven or non-woven material as discussed above or a polymer membrane as discussed in the third aspect of the invention.

Textiles comprising the inventive membrane fulfill the customer expectations, particularly regarding performance in WC and WVTR. Such textiles comprise fluorine free and optionally silicone free materials. Therefore the product can be disposed of in a naturally benign way, such as non-hazardous incineration. Further, a biodegradable chemical composition of such textiles can be ensured. The enabling technology is more versatile when compared with existing processes; this is particularly due to the pore functionalization, the pore structure and option for multilayer structures with multifunctional (e.g. hydrophilic and hydrophobic) membranes.

The present invention relates in a fifth aspect to uses/methods of use of the membranes, textiles and intermediates as described herein.

Membranes: In one embodiment, the present invention relates to the use of a membrane as described herein as part of a woven or non-woven textile. The inventive membranes prove to be useful in a number of applications, including textile materials. This aspect of the invention shall be explained in further detail below. The inventive membranes are self-supporting ("free standing"). Therefore, they distinguish from known membranes of similar thickness and porosity on a support. However, the inventive material is suitable for coating an appropriate support. The possibility of manufacturing such membrane independent from a specific support makes it very versatile.

Textiles: In general, the inventive textiles retain the beneficial properties of the polymer membranes, particularly being water-proof and being breathable, and are thus suitable for all uses that are applicable to such membranes; this particularly includes the uses as disclosed herein, e.g. in a textile material.

Intermediates/Starting Materials: The inventive intermediates may be used in a process for manufacturing a membrane as described herein.

The invention thus provides for the use of coated particles as described herein in the manufacture of a suspension, in the manufacture of a membrane and in the manufacture of a textile product.

The invention further provides for the use of a suspension as described herein in the manufacture of a textile product. The invention further provides for the use of a kit of parts as described herein in the manufacture of a suspension, in the manufacture of a membrane, and in the manufacture of a textile product.

To further illustrate the invention, the following examples are provided. These examples are provided with no intent to limit the scope of the invention.

I. Synthesis

Polymer mixture of the two commercially available ether-based polyurethanes COIM Laripur 70 D 60 and COIM Laripur 6515 was obtained by dissolving 84 g of COIM Laripur 70 D 60 and 56 g of COIM Laripur 6515 in 1260 g of N,N-dimethylacetamide (abcr 99% in 50 kg barrel) using an external stirrer (IKA®RW 20 digital). The resulting dissolution was run through a ball mill once (WAB Dyno®-Mill Multi Lab at 10 rpm pumping rate and 3800 U/min milling rotation with 1 mm $ZrO_2$ milling beads) to receive the final polymer solution.

I.1 EXAMPLE 1

700 g of polymer mixture was hand-mixed with 280 g calcium carbonate nano particles (American Elements 97.5%). Further mixing was conducted in a ball mill (WAB Dyno®-Mill Multi Lab at 10 rpm pumping rate and 3800 U/min milling rotation with 1 mm zirconium dioxide milling beads) by running the mixture 4 times through the mill to receive the final dispersion to be degassed in vacuum.

I.2 EXAMPLE 2

700 g of polymer mixture was hand-mixed with 260 g of calcium carbonate powder (Fluka Ph Eur). Further mixing was conducted in a ball mill (WAB Dyno®-Mill Multi Lab at 10 rpm pumping rate and 3800 U/min milling rotation with 1 mm zirconium dioxide milling beads) by running the mixture 4 times through the machine to receive the final dispersion to be degassed in vacuum.

I.3 EXAMPLE 3

700 g of polymer mixture was blended with 260 g of calcium carbonate powder (Fluka Ph Eur).

9.88 g of stearic acid (denoted here as C18OOH, or C17H35COOH; Sigma-Aldrich 95%) were added as an additive to the mixture.

Further mixing was conducted in a ball mill (WAB Dyno®-Mill Multi Lab at 10 rpm pumping rate and 3800 U/min milling rotation with 1 mm zirconium dioxide milling beads) by running the mixture 4 times through the machine to receive the final dispersion to be degassed in vacuum.

I.4 EXAMPLE 4 (ACCORDING TO THE INVENTION)

260 g calcium carbonate nano particles (; American Elements 97.5%) with 13 g of octadecyltrimethoxysilane (C18H37Si(OMe)3; abcr chemicals 97%) were mixed in 260 g of DMAC and run once through a ball mill (WAB Dyno®-Mill Multi Lab at 10 rpm pumping rate and 3800 U/min milling rotation with 1 mm zirconium dioxide milling beads). The particles were dried on a rotary evaporator (Buchi Rotavapor R-210 with a Vacuum Controller V-850) to receive the coated particles. 700 g of polymer mixture was hand-mixed with 273 g C18 Sin-CaCO3. Further mixing was conducted in a ball mill (WAB Dyno®-Mill Multi Lab at 10 rpm pumping rate and 3800 U/min milling rotation with 1 mm zirconium dioxide milling beads) by running the mixture 4 times through the mill to receive the final dispersion to be degassed in vacuum.

I.5 EXAMPLE 5 (ACCORDING TO THE INVENTION)

260 g calcium carbonate particles (Fluka Ph Eur) with 9.88 g of stearic acid (C18OOH or C17H35COOH; Sigma-Aldrich 95%) were mixed in 260 g of DMAC and run once through a ball mill (WAB Dyno®-Mill Multi Lab at 10 rpm pumping rate and 3800 U/min milling rotation with 1 mm zirconium dioxide milling beads). The particles were dried on a rotary evaporator (Buchi Rotavapor R-210 with a Vacuum Controller V-850) to receive the coated particles.

700 g of polymer mixture was hand-mixed with 269.88 g C18OOHsCaCO3. Further mixing was conducted in a ball mill (WAB Dyno®-Mill Multi Lab at 10 rpm pumping rate and 3800 U/min milling rotation with 1 mm zirconium dioxide milling beads) by running the mixture 4 times through the mill to receive the final dispersion to be degassed in vacuum.

Membrane Production: Samples for testing purposes were calendered (Zehnter GmbH, ZAA 2300) onto a flat surface and the coated particles were removed by weak hydrochloric acid solution (0.5M HCl in water). For further measurements the membranes were dried overnight. 6 replicate membranes were produced per batch of dispersion.

I.6 EXAMPLE 6 (ACCORDING TO THE INVENTION)

260 g calcium carbonate nano particles (American Elements 97.5%) with 13 g of octadecyltrimethoxysilane (C18H37Si(OMe)3; abcr chemicals 97%) were mixed in 260 g of DMAC and run once through a ball mill (WAB Dyno®-Mill Multi Lab at 10 rpm pumping rate and 3800 U/min milling rotation with 1 mm zirconium dioxide milling beads). The particles were dried on a rotary evaporator (Buchi Rotavapor R-210 with a Vacuum Controller V-850) to receive the coated particles.

I.7 EXAMPLE 7 (ACCORDING TO THE INVENTION)

260 g calcium carbonate particles (Fluka Ph Eur) with 9.88 g of stearic acid (C18OOH or C17H35COOH; Sigma-Aldrich 95%) were mixed in 260 g of DMAC and run once through a ball mill (WAB Dyno®-Mill Multi Lab at 10 rpm pumping rate and 3800 U/min milling rotation with 1 mm zirconium dioxide milling beads). The particles were dried on a rotary evaporator (Buchi Rotavapor R-210 with a Vacuum Controller V-850) to receive the coated particles. A micrograph of the obtained material is shown in FIG. 4, right.

II. Analytics

Figure 3:
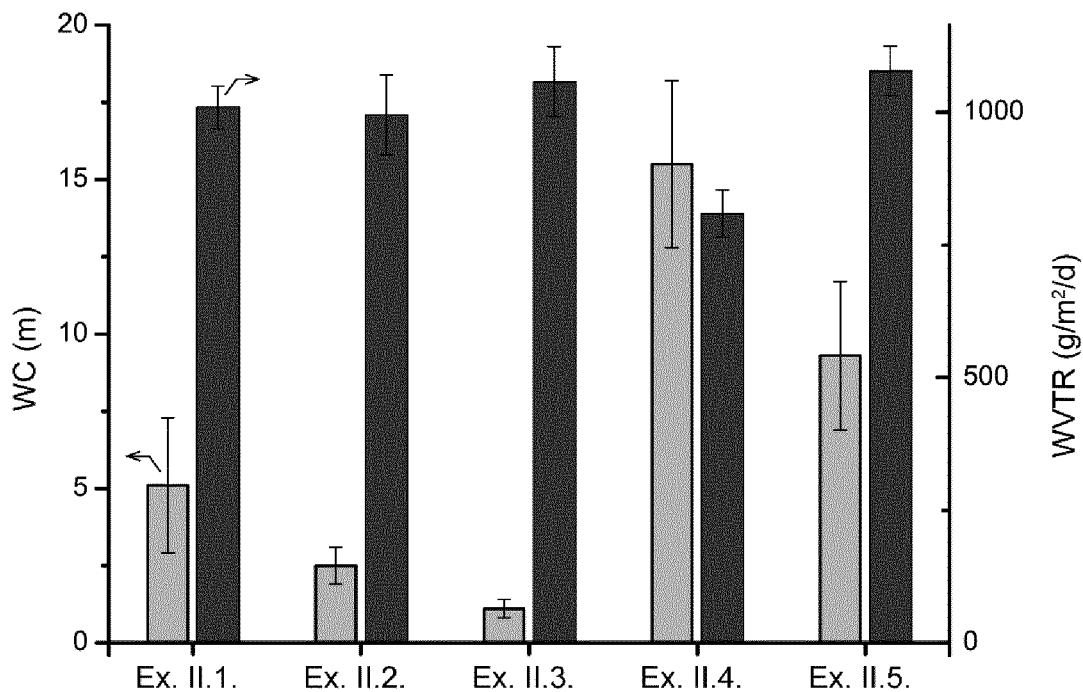

Water Column Measurement:

According to ISO 811 the water column (WC in [m]) was measured in a self-designed device. Videotaping the penetration of water over increasing pressure allowed precise analysis of the water column. Per sample an area of 7.07 cm$^2$ was measured. The results are shown in FIG. 3. The data show a significant increase in WC for the use of coated particles according to this invention.

Water Vapor Transmission Rate:

According to ASTM E96 B the water vapor transmission rate (WVTR in [g/m$^2$/d]) was measured using covered plastic cups with an exposed sample area of 0.008667 m$^2$. The membrane was air- and watertightly attached to the rim and the samples were placed in a climate chamber (APT-Line™ KBF-ICH, Binder GmbH) at 23° C. and 50% RH at 1 m/s ventilation. With a starting weight of 110 g the weight loss was recorded after 24 h and the final WVTR was calculated. The results are shown in FIG. 3. The data show that the use of coated particles according to this invention is of no negative consequence to the WVTR.

Particle Size:

The particle size was determined from the surface area, which was measured by gas adsorption at −196° C. (liquid nitrogen) with the BET method ($A_{BET}$ in square meter per gram; m$^2$/g). Spherical geometry of the particle was assumed along with a density of an approximated 3 gram per cubic centimeter (g/cm$^3$) for the calcium carbonate particles. With the following relation the diameter was calculated:

$$d = \frac{6V}{A} = 6\, A_{BET}\, \rho$$

Where d was the diameter in meter (m), V the volume in cubic meter (m$^3$), A the surface area of the particles in square meter (m$^2$) and p the density of the particles in gram per cubic meter (g/m$^3$). The results are shown in table 1.

Tensile Properties:

Physical tensile properties were measured using Shimadzu Universal Testing Instrument AGS-X equipped with a 100 N load cell and pneumatic clamps. The samples were cut and measured following ASTM D6287-09 and D882-12. Cross sectional area was measured by the width of the sample (measured by ruler) and the thickness (measured with MiniTest 700 against the 62.1±0.5 μm standard plate to avoid bending of the sample at the tip of the cone). To include porosity into the force calculation the micrographs (FEI, NovaNanoSEM 450 at 3 kV.) were analysed.

Shore Hardness:

The aforementioned mixture of two commercial polymers showed a shore hardness (ASTM D2240) measured with the C and D durometers. Porous membranes could not be tested due to insufficient layer thickness.

Contact Angle:

Final porous membranes were stabilized on a flat surface and a drop of 250 μl was applied via pipet and photographed with a Canon 450 D. Using imageJ (version 1.47) and the Snake Drop analysis add on the contact angles were determined.

Porosity and Poremouth Diameter:

The scanning electron micrographs (FEI, NovaNanoSEM 450 at 3 kV.) images were analyzed with imageJ (Version 1.47) to determine the porous structure on both sides of the membrane. For the porosity Adobe Photoshop was used to analyze micrographs of a cut membrane.

Elemental Analysis:

Elemental analysis was determined with an Elementar vario MICRO cube in CHNS mode (Combustion tube at 1150° C., reduction tube at 850° C. and 20 s of 02 feed). Sample weight was about two milligram each and the calibration was done against sulfanilamide.

TABLE 1

Figure 5:
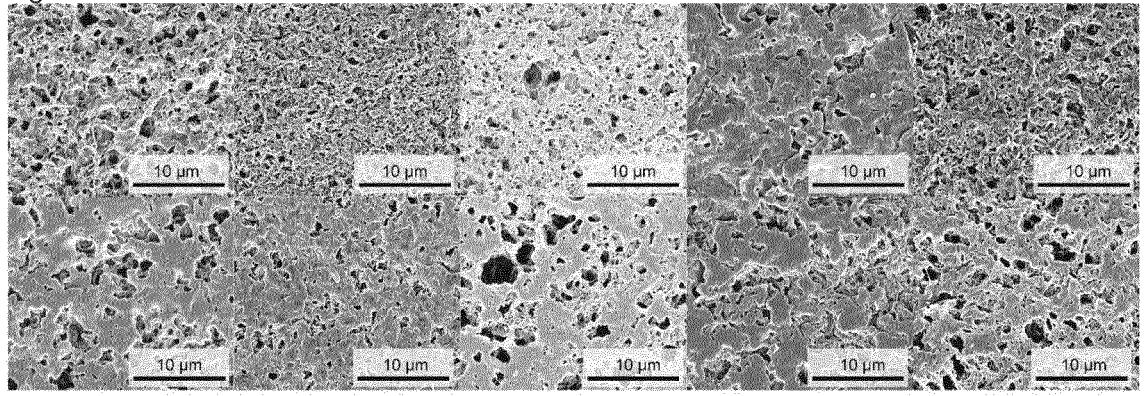
FIG. 5 shows micrographs of membranes (ex.1, 2, 3 for comparison and ex 4, 5 according to the invention) as prepared according to the examples. As can be seen, the morphology and pore size is not affected by the selection of uncoated/coated particles.

In reference to FIG. 3 and 5 shows the materials used to form the pores.

|  | Ex. 1 | Ex. 2 | Ex. 3 | Ex. 4 | Ex. 5 |
|---|---|---|---|---|---|
| Template material | CaCO3 (Ø d: 0.4 μm) | CaCO3 (Ø d: 0.4 μm) | CaCO3 (Ø d: 0.4 μm) | CaCO3 (milled for coating) | CaCO3 (milled for coating) |

TABLE 1-continued

In reference to FIG. 3 and 5 shows the materials used to form the pores.

| | Ex. 1 | Ex. 2 | Ex. 3 | Ex. 4 | Ex. 5 |
|---|---|---|---|---|---|
| Template Surface coating | — | — | — | coated with $C_{18}H_{37}Si(OMe)_3$ | coated with $C_{17}H_{35}COOH$ |
| Additives | — | — | $C_{17}H_{35}COOH$ | — | — |
| average pore diameter air side | 295 nm | 194 nm | 252 nm | 234 nm | 246 nm |
| average pore diameter substrate side | 343 nm | 223 nm | 334 nm | 276 nm | 277 nm |

For ex. 7, the elemental analysis showed an increase in carbon content of from 11.43% for the uncoated particles (shown in FIG. 4 on the left) to 13.85 for the coated particles (in FIG. 4 on the right), which proofs the coating of the particles without changing the topography of the particles.

III Comparative Example

Further comparative data are provided, based on the disclosure of Luechinger et al, WO 2012/097967. In this comparative example, non-coated particles are used as template materials. As can be seen, the membranes obtained are either breathable or waterproof, not both.

Synthesis:

The polymer COIM Laripur 6515 was dissolved in Dimethylsulfoxide (Fisher, for analysis). The used polymers are produced by COIM and are sold under the brand name Laripur, the numbering is the specific grade within this product series.

The polymer solution was mixed with calcium carbonate nano particles (American Elements 97.5%) at the shown weight ratios (see Table 2) in a ball mill (Fritsch pulverisette 7; half the mass of 0.1 mm ZrO2 beads per mass of mixture was used) for three times 20 minutes at 1100 rpm to yield the final dispersion. The dispersion was degassed under vacuum prior to use.

Membrane Production:

Samples for testing purposes were calendered (Zehnter GmbH, ZAA 2300) onto a flat surface and the uncoated particles were removed by weak hydrochloric acid solution (0.5M HCl in water). For further measurements the membranes were dried overnight.

Analytics:

The samples shown in table 2 were analyzed as discussed above, section II. For WVTR, the following modifications were applied: The same kind of cups as described above were tested at 23° C. and 25% RH with a ventilation system of about 2 m/s above the covered cups. These slightly modified conditions, with higher gradients across the sample (higher wind speed, and drier conditions) are more suited to detect improved values in breathability.

TABLE 2

Polyurethane membranes made with non-coated particles.

| # Polymer | Shore hardness | Solv. | % wt *) | WC [m] | WVTR [g m$^{-2}$ d$^{-1}$] |
|---|---|---|---|---|---|
| III.1 6515 | 65 A (soft) | DMSO | 0 | 54 | 237 |
| III.2 6515 | 65 A (soft) | DMSO | 50 | 22 | 440 |
| III.3 6515 | 65 A (soft) | DMSO | 90 | 4 | 565 |

*) of pore template per polymer

The values illustrate the difficulty of producing porous membranes exhibiting both, a high water column combined with a useful breathability.

The invention claimed is:

1. A method of manufacturing a porous polymer membrane having a pore size of 5-1000 nm, comprising the steps of
   a) providing a dispersion comprising
      one or more diluents in an amount of at least 40 wt. %,
      one or more polymers dissolved therein,
      one or more coated particles dispersed therein,
      optionally one or more additives dissolved therein
      whereby the ratio (wt %) of polymer: coated particles is in the range of 2:1 to 0.01:1, and
      whereby the coated particles are pre-manufactured,
      are selected from the group consisting of organic salts, metal salts, metal oxides and combinations thereof,
      the coating material is selected from the group of carboxylic acids, aryl-alkoxy-silanes alkyl-aryl-alkoxy-silanes and alkyl-alkoxy-silanes, and
      have a particle size in the range of 5-1000 nm;
   b) coating a substrate with said dispersion;
   c) optionally subjecting the obtained material to a drying step;
   d) optionally subjecting the thus obtained material to a polymerisation or cross-linking step;
   e) removing said one or more particles by a dissolution step;
   f) optionally removing the obtained polymer membrane from said supporting material.

2. The method of claim 1, wherein
   said method does not involve a phase separation step; and/or
   one or more of said steps a) to f), are performed continuously; and/or
   said coating step (b) is selected from the group consisting of spraying, painting, roll-to-roll processes, and dip-coating; and/or
   said step (f) is performed prior to step (e); and/or
   said dissolution (e) is performed in 90 min or less.

3. The method according to claim 1, wherein
   said metal salts are selected from the group consisting of carbonates, hydrogencarbonates, sulphates, halogenides, nitrates and phosphates and said metal oxides are selected from ZnO and MgO; and/or
   said coating material is selected from the group of natural fatty acids, particularly stearic acid; and/or
   said diluents are selected from the group consisting of organic solvents with a b.p. below 200° C.; and/or
   said polymers are selected from the group of soluble polymers, pre-polymers that can be polymerized and pre-polymers that can be cross-linked; and/or said supporting material is selected from the group consisting of polymers, metals, ceramics and paper, each coated or uncoated.

4. The method according to claim 1, wherein said soluble polymers/pre-polymers that can be polymerized/prepolymer that can be cross-linked are selected from the group consisting of polysulfones, polyethersulfones, polycarbonates, polystyrenes, polyacrylates, polysiloxanes, polyarylates, polyurethanes, ethyl-vinylacetates, artificial and natural rubbers, polyesters, polyether, polyaryletherketones, polyamides, polyacrylates, polyarylates, cyclo-olefin-copolymers and polyolefins.

5. The method according to claim 1,
wherein said polymer membrane:
has a thickness of 0.01-1000 μm; and/or
has a porosity of 10-90%; and/or
has a poremouth size of 5-2000 nm; and/or
has a water column (WC) of at least 4.8 m; and/or
has a water vapour transmission rate of at least 500 g/m2 per day (WVTR, measured according to the ASTM Standard E96 B); and/or
has a water contact angle of at least 50°.

6. The method according to claim 1, wherein said dispersion contains:
from 40 to 99 wt.-% diluents;
from 1 to 20 wt.-% polymers;
from 0.5 to 40 wt.-% coated particles; and
from 0 to 5 wt.-% additives.

7. The method according to claim 1, wherein said coated particles
have an average size of 5-500 nm; and/or
the coating amounts to 1-10 wt % of the coated particle; and/or
were coated under conditions in which the coating material does not alter the particle size or particle shape.

8. The method according to claim 2, wherein all of steps a) to f) are performed continuously.

9. The method according to claim 2, wherein
said metal salts are selected from the group consisting of carbonates, hydrogencarbonates, sulphates, halogenides, nitrates and phosphates and said metal oxides are selected from ZnO and MgO; and/or
said coating material is selected from the group of natural fatty acids, particularly stearic acid; and/or
said diluents are selected from the group consisting of organic solvents with a b.p. below 200° C.; and/or
said polymers are selected from the group of soluble polymers, pre-polymers that can be polymerized and pre-polymers that can be cross-linked; and/or
said supporting material is selected from the group consisting of polymers, metals, ceramics and paper, each coated or uncoated.

* * * * *